(12) United States Patent
Speirs et al.

(10) Patent No.: US 6,472,010 B1
(45) Date of Patent: *Oct. 29, 2002

(54) GELLING SYSTEM COMPRISING CARRAGEENAN AND COCONUT ENDOSPERM

(75) Inventors: Charles Ivie Speirs; Stephen Harford, both of Oakham (GB)

(73) Assignee: Mars U.K. Limited, Berkshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,206

(22) PCT Filed: Jun. 5, 1996

(86) PCT No.: PCT/GB96/01336

§ 371 (c)(1),
(2), (4) Date: Mar. 16, 1998

(87) PCT Pub. No.: WO96/39046

PCT Pub. Date: Dec. 12, 1996

(30) Foreign Application Priority Data

Jun. 6, 1995 (GB) ............................................. 9511404
Jul. 20, 1995 (GB) ............................................. 9514919

(51) Int. Cl.[7] .................................................. A23L 1/05
(52) U.S. Cl. ........................ 426/578; 426/579; 426/617; 426/509; 426/521
(58) Field of Search ................................ 426/573, 617, 426/574, 575, 576, 577, 578, 579, 509

(56) References Cited

U.S. PATENT DOCUMENTS

| | | | | | |
|---|---|---|---|---|---|
| 2,466,146 A | * | 4/1949 | Baker | ......................... | 426/573 |
| 2,864,706 A | * | 12/1958 | Stoloff | ......................... | 99/131 |
| 3,176,003 A | * | 3/1965 | Stancioff et al. | ............. | 426/573 |
| 3,342,612 A | * | 9/1967 | Foster et al. | .................... | 99/131 |
| 3,562,176 A | * | 2/1971 | Stancioff et al. | ............. | 426/573 |
| 3,899,606 A | * | 8/1975 | Forkner | ...................... | 426/250 |
| 3,956,173 A | * | 5/1976 | Towle | ......................... | 252/316 |
| 3,962,482 A | * | 6/1976 | Comer et al. | ................. | 426/575 |
| 4,089,981 A | * | 5/1978 | Richardson | ................. | 426/104 |
| 4,215,040 A | * | 7/1980 | Hager | ...................... | 260/123.5 |
| 4,427,704 A | * | 1/1984 | Cheney et al. | ............. | 426/104 |
| 4,486,345 A | * | 12/1984 | Callewaert | ................ | 260/123.5 |
| 4,515,822 A | * | 5/1985 | Kraig et al. | ................. | 426/445 |
| 4,623,552 A | * | 11/1986 | Rapp | ........................ | 426/575 |
| 4,722,851 A | * | 2/1988 | Kadan et al. | ................. | 426/579 |
| 4,826,700 A | * | 5/1989 | Bayerlein et al. | ........... | 426/573 |
| 4,840,811 A | * | 6/1989 | Bayerlein et al. | ........... | 426/430 |
| 4,904,483 A | * | 2/1990 | Christensen et al. | .......... | 426/44 |
| 4,943,445 A | * | 7/1990 | Norton et al. | ............... | 426/573 |
| 5,063,073 A | * | 11/1991 | Kratochuil | ................... | 426/573 |
| 5,100,688 A | * | 3/1992 | Cox et al. | .................... | 426/573 |
| 5,194,285 A | * | 3/1993 | Norton | ....................... | 426/603 |
| 5,338,560 A | * | 8/1994 | Wesdorp et al. | ............. | 426/573 |
| 5,338,561 A | * | 8/1994 | Campbell et al. | ........... | 426/602 |
| 5,458,904 A | * | 10/1995 | Zolper | ......................... | 426/96 |
| 5,599,575 A | * | 2/1997 | Loh et al. | .................... | 426/617 |
| 5,607,716 A | * | 3/1997 | Doherty et al. | ............. | 426/660 |
| 5,698,254 A | * | 12/1997 | Campbell et al. | ........... | 426/617 |

FOREIGN PATENT DOCUMENTS

| | | |
|---|---|---|
| DE | 26 30 158 | 1/1978 |
| EP | 139 913 | 5/1986 |
| EP | 185 511 | 6/1986 |
| GB | 886487 | 1/1962 |
| GB | 2 131 669 A | 6/1984 |

OTHER PUBLICATIONS

Chakraborty, B.K. et al., Journal of Food Science, "Stabilization of Calcium Sensitive Plant Proteins by K–Carrageenan", Jul.–Aug. 1972, vol. 37, pp. i and 719–721.

Balasubramanian, K., Journal of Food Science, "Polysaccarides of the Kernel of Maturing and Matured Coconuts", 1976, vol. 41, pp. 1370 and 1372.

Saittagaroon, S., Kawakishi, S. and Namiki, M., "Characterisation of Polysaccharides of Copra Meal", Jul. 16, 1982, pp. 855–860.

Monro, J.A., "Dietary Fibre of Coconuts form a Pacific Atoll: Soluble and Insoluble Components in Relation to Maturity", Oct. 17, 1984, pp. 1013–1018.

Patent Abstracts of Japan, vol. 017, No. 708 (C–1147), Dec. 24, 1993.

\* cited by examiner

*Primary Examiner*—Nina Bhat
(74) *Attorney, Agent, or Firm*—Fitzpatrick, Cella, Harper & Scinto

(57) ABSTRACT

An elastic hydrous gel comprising a synergistic mixture of coconut endosperm and carrageenan, preferably in a ratio of at least 1, and more preferably at lest 5, parts coconut to 10 parts carrageenan by weight is disclosed. A process for making the gel is also disclosed.

24 Claims, No Drawings

GELLING SYSTEM COMPRISING CARRAGEENAN AND COCONUT ENDOSPERM

A variety of materials have been reported which demonstrate synergism with kappa-carrageenan. These include locust bean gum which, when blended with carrageenan, gives water gels with a more gelatine-like texture and decreased syneresis when compared to pure carrageenan gels.

It has now been found that the endosperm of the cococut (*Cocos nucifera*) when blended with kappa-carrageenan gives firm elastic hydrous gels demonstrating outstanding synergism. This invention embraces all gels in which these two components are present in quantities (on a dry, fat-free weight basis) of at least 1 part coconut endosperm per 10 parts kappa-carrageenan, and at least 0.1 parts in total of coconut endosperm and carrageenan per 100 per water.

Fresh coconut endosperm has typical nutrient distribution of water (35%), oil (44%), protein (6%), sugars (7%), fibre (3%) and ash (1%).

It has been found that the endosperm can be used directly in food systems together with carrageenan to give the desired gel texture. Alternatively it can be used in the form of a defatted dried flour or as full fat desiccated coconut to give the same effect.

Freshly prepared endosperm has the highest degree of gelling functionality but more degraded materials can be used if the concentration is adjusted. Examples of degraded materials include excessively heated or enzymatically treated endosperm where the cellular structure of the flesh is partially destroyed to facilitate coconut oil recovery from copra. Degradation may also occur during the preparation of copra. Copra is sun dried coconut endosperm. When the sun drying conditions are poor, microbial spoilage may degrade the coconut flesh.

To obtain an acceptable elastic gel, there is no significant upper limit to the ratio (expressed on a dry, fat-free weight basis) of carrageenan to coconut, but the preferred ratio is from 1 to 200 parts of coconut for each 10 parts of carrageenan. The most preferred ratios are between 5 and 100 parts of coconut for each 10 parts of carrageenan.

There is no significant upper limit to the preferred total concentration of carrageenan and coconut (on a dry fat-free weight basis) but the preferred concentrations are in the range 0.1 to 10 parts by weight of carrageenan and coconut added to 100 parts water. The most preferred range is 0.5 to 5 parts to 100 parts water.

These ratios refer to the use of good quality, dry, fat-free coconut material such as the material prepared in Example 1 below. If degraded material were to be include either as a portion or the whole of the coconut component of the gel then levels greater than the preferred levels described above may be required to give the desired effect, and this invention includes the use of equivalent quantities of degraded materials.

The gel according to the invention can incorporate meat or other nutritious material to constitute a gelled food product. It can be heat treated by pasteurization or sterilization.

The gel according to the invention can also be used in the processing of foodstuffs or animal feeds. The invention also provides a process for 1. An elastic hydrous synergistic gel containing, on a dry, fat-free weight basis at least 1 part coconut endosperm per 10 parts kappa-carrageenan and at leat 0.1 parts in total of coconut endosperm and carrageenan per 100 parts water.

If a galactomann- or glucomannan- containing material is to be additionally included in a gel according to the invention, as discussed below, the material is additionally dispersed in the water along with the coconut endosperm and carrageenan.

The following examples describe the methods of preparation of the coconut together together with the process for using the coconut material and the attributes of the products obtained. In all examples the level of inclusion of any coconut material are adjusted to the inclusion levels of the fat and moisture free material described in Example 1.

EXAMPLE 1

This example describes the preparation and use of defatted dried coconut flour.

Coconuts were obtained from the local market and the white flesh or endosperm recovered. The endosperm was finely ground and repeatedly extracted with acetone to remove the fat and water. The coconut powder (1 g) was heated to 121° C. for 15 minutes in the presence of kappa-carrageenan (0.5 g) and distilled water (98.4 g). On cooling, a strong elastic gel was formed.

When Example 1 was repeated omitting the coconut powder a very weak gel was formed. These examples demonstrate that carrageenans and coconut endosperm have a synergistic relationship.

EXAMPLE 2

This example describes the preparation and application of mechanically defatted copra cake.

Dried coconut endosperm known as copra was crushed to form a powder. The powdered copra was heated to 120° C. and using techniques widely known in the art of oilseed processing, and passed through a hydraulic press or expeller to remove most of the oil. The copra press cake or meal was then extracted with distilled water at 95° C. for 60 minute. The extract obtained by this process was dried to a powder.

The powder obtained was blended with kappa carrageenan and water within the preferred proportions above described and heated to 85° C. On cooling, useful elastic food gels were formed.

EXAMPLE 3

This example describes the use of fresh coconut to give a desert product.

Fresh coconut endosperm (40 g) was finely ground and added to skimmed milk (100 g) to which had been added carrageenan (0.2 g), sugar (50 g) and sodium tripolyphosphate (0.2 g). The formulation was processed at 121° C. for 15 minutes. On cooling, a coconut milk gel had formed.

When Example 3 was repeated omitting the coconut a thickened milk product was obtained but without the gel structure conferred by the coconut and the carrageenan acting synergistically.

EXAMPLE 4

This example described the preparation of a canned meat product.

Minced beef (200 g) was blended with kappa-carrageenan (0.8 g), coconut powder as prepared in Example 1 (1.6 g) and 200 g of water containing sodium tripolyphosphate (1.0 g), sodium chloride (1.0 g) and potassium chloride (0.8 g). The blend was thermally processed at 129° C. for 55 minutes in can. On cooling, a gelled meat product was obtained.

Although this invention is primarily concerned with gels formed with coconut and carrageenan, it includes gels with other components in which the charateristic synergism of the two aforementioned components is found. Thus, it is also possible to make gels using carrageenan and coconut together with a third component such as a galactomannan- or glucomannan- containing material, for example locust bean gum, cassia gum or konjac mannan. In this case lesser amounts of the galactomannan- or glucomannan- containing material are added to form gels with carrageenan and coconut than would be added to form gels with carrageenan alone to give a gel of similar elastic structure.

Such gels can be produced from carrageenan and at least one galactomannan- or glucomannan-containing material in which, for each 100 parts by weight of coconut additionally present in the gel, the level of galactomannan-or glucomannan-containing material in the gel is reduced by between 1 and 100 parts, preferably by between 2 and 20 parts and most preferably by between 5 and 10 parts.

The following is an example of such a termary formulation.

EXAMPLE 5

Carrageenan (0.7 g),. Locust bean gum (0.25 g) and copra press cake (1.6 g) were dispersed in 100 g of distilled water and heated at 121° C. for 15 minutes with constant agitation. On cooling, a firm elastic gel was formed. By way of comparison, carrageenan (0.7 g) and locust bean gum (0.41 g) were dispersed in 100 g of distilled water and heated at 121° C. for 15 minutes with constant agitation. The gel formed was of similar characteristics to the one formed was of similar characteristics to the one formed containing copra press cake and reduced level of locust bean gum.

What is claimed is:

1. An elastic hydrous gel comprising water together with coconut endosperm and kappa-carrageenan as synergistic gel-forming agents, wherein said gel contains, on a dry, fat-free weight basis at least 1 part coconut endosperm per 10 parts kappa-carrageenan and at least 0.1 parts in total of coconut endosperm and carrageenan per 100 parts water.

2. A gel according to claim 1 containing, on a dry, fat-free weight basis, from 1 to 200 parts coconut endosperm per 10 parts carrageenan, and from 0.1 to 10 parts in total of coconut endosperm and carrageenan per 100 parts water.

3. A gel according to claim 2 which additionally contains another galactomannan- or glucomannan-containing material.

4. A gel according to claim 2 which additionally comprises meat or other nutritious material incorporated in said gel and constituting a gelled food product.

5. A gel according to claim 4 which has been pasteurized or sterilized by heat.

6. A gel according to claim 1 containing, on a dry, fat-free weight basis from 5 to 100 parts and 0.5 parts to 5 parts in total of coconut endosperm and carrageenan per 100 parts water.

7. A gel according to claim 1 which additionally comprises meat or other nutritious material incorporated in said gel and constituting a gelled food product.

8. A gel according to claim 1 which has been pasteurized or sterilized by heat.

9. A gel according to claim 1 in which the specified amount of coconut endosperm is supplied by degraded coconut material.

10. A process for producing an elastic hydrous gel which comprises the steps of:

(a) dispersing particulate coconut endosperm and kappa-carrageenan in water, wherein at least 0.1 parts of said particulates, in total of carrageenan and coconut on a dry, fat-free weight basis, are added to 100 parts water, and the dry, fat-free weight ratio of coconut endosperm to carrageenan is at least 1 part coconut per 10 parts carrageenan; and (b) heating the dispersion until a gel is formed.

11. A process according to claim 10 in which, on a dry, fat-free weight basis, from 0.1 to 10 parts in total of carrageenan and coconut endosperm are added to 100 parts water, and the dry, fat-free weight ratio is from 1 to 200 parts coconut endosperm per 10 parts carrageenan.

12. A process according to claim 10 in which, on a dry, fat-free weight basis, from 0.5 to 5 parts in total of carrageenan and coconut endosperm are added to 100 parts water, and the dry, fat-free weight ratio is from between 5 and 100 parts coconut endosperm per 10 parts carrageenan.

13. A process according to claim 12 comprising the additional step of heat treating said gel by pasteurization or sterilization.

14. A process according to claim 12 comprising the additional step of incorporating meat or other nutritious material in the gel to constitute a food product.

15. A processing according to claim 10 in which the coconut is in the form of ground fresh endosperm, defatted dried coconut flour, or ground copra or desiccated coconut.

16. A process according to claim 10 in which another galactomannan or glucomannan-containing material is additionally dispersed in the water along with coconut endosperm and carrageenan.

17. A process according to claim 10 in which the coconut endosperm is supplied by degraded coconut material.

18. A process according to claim 10 comprising the additional step of heat treating said gel by pasteurization or sterilization.

19. A process according to claim 10 comprising the additional step of incorporating meat or other nutritious material in the gel to constitute a food product.

20. A process according to claim 10 in which said gel is incorporated in a foodstuff or animal feed.

21. A sterilized gelled food or animal feed product containing heat-resistant elastic hydrous gel comprising water together with coconut endosperm and kappa-carrageenan as synergistic gel-forming agents, wherein said gel contains, on a dry, fat-free weight basis at least 1 part coconut endosperm per 10 parts kappa-carrageenan and at least 0.1 parts in total of coconut endosperm and carrageenan per 100 parts of water; said product having been sterilized by heat.

22. A gel according to claim 21 which additionally comprises meat or other nutritious material incorporated in said gel and constituting a gelled food product.

23. A process for producing a sterilized food or animal feed product which comprises the steps of:

a) dispersing particulate coconut endosperm and kappa-carrageenan in water, wherein at least 0.1 parts of said particulates, in totoal of carrageenan and coconut on a dry, fat-free weight basis, are added to 100 parts water, and the dry, fat-free weight ratio of coconut endosperm to carrageenan is at least 1 part coconut per 10 parts carrageenan; and b) heating the dispersion for sufficient time and temperature to form a gel and to sterilize the product.

24. A process according to claim 23 comprising the additional step of incorporating meat or other nutritious material in the gel to constitute a food product.

* * * * *

UNITED STATES PATENT AND TRADEMARK OFFICE
CERTIFICATE OF CORRECTION

PATENT NO. : 6,472,010 B1
DATED : October 29, 2002
INVENTOR(S) : Charles Speirs et al.

It is certified that error appears in the above-identified patent and that said Letters Patent is hereby corrected as shown below:

Title page,
Item [56], OTHER PUBLICATIONS, "Coconuts form a Pacific" should read
-- Coconuts from a Pacific --.
Item [57], ABSTRACT,
Line 3, "lest 5," should read -- least 5, --.

Column 1,
Line 44, "dry" should read -- dry, --;
Line 51, "include" should read -- included --; and
Line 66, "leat" should read -- least --.

Column 2,
Line 1, "galactomann- or" should read -- galactomannan- or --;
Line 7, "together together" should read -- together --;
Line 21, "(0.5 g)" should read -- (0.6 g) --;
Line 37, "60 minute." should ead -- 60 minutes. --;
Line 39, "kappa carrag-" should read -- kappa-carrag- --; and
Line 47, "desert" should read -- dessert --.

Column 3,
Line 15, "galactomannan-or" should read -- galactomannan- or --;
Line 19, "termary" should read -- ternary --;
Line 23, "(0.7 g).. Locust" should read -- (0.7 g), locust --;
Line 30, "was" (second occurrence) should be deleted; and
Line 31, "of similar characteristics to the one formed" should be deleted.

UNITED STATES PATENT AND TRADEMARK OFFICE
CERTIFICATE OF CORRECTION

PATENT NO. : 6,472,010 B1
DATED : October 29, 2002
INVENTOR(S) : Charles Speirs et al.

It is certified that error appears in the above-identified patent and that said Letters Patent is hereby corrected as shown below:

Column 4,
Line 27, "galactomannan or" should read -- galactomannan- or --.

Signed and Sealed this

Twelfth Day of August, 2003

JAMES E. ROGAN
*Director of the United States Patent and Trademark Office*